United States Patent
Wang et al.

(10) Patent No.: US 7,627,477 B2
(45) Date of Patent: Dec. 1, 2009

(54) ROBUST AND INVARIANT AUDIO PATTERN MATCHING

(75) Inventors: Avery Li-Chun Wang, Palo Alto, CA (US); Daniel Culbert, Sunnyvale, CA (US)

(73) Assignee: Landmark Digital Services, LLC, Nashville, TN (US)

( * ) Notice: Subject to any disclaimer, the term of this patent is extended or adjusted under 35 U.S.C. 154(b) by 713 days.

(21) Appl. No.: 10/978,313

(22) Filed: Oct. 21, 2004

(65) Prior Publication Data

US 2005/0177372 A1 Aug. 11, 2005
US 2009/0265174 A9 Oct. 22, 2009

Related U.S. Application Data

(63) Continuation of application No. PCT/US03/12126, filed on Apr. 18, 2003.

(60) Provisional application No. 60/376,055, filed on Apr. 25, 2002.

(51) Int. Cl.
*G10L 21/00* (2006.01)

(52) U.S. Cl. ............... 704/273; 704/217; 704/257; 704/224; 704/270; 341/155; 341/110; 341/114; 348/515; 348/464; 348/500

(58) Field of Classification Search ............. 704/273, 704/217, 257, 224; 341/155, 110, 144; 386/104; 348/515, 464, 500
See application file for complete search history.

(56) References Cited

U.S. PATENT DOCUMENTS

| | | | |
|---|---|---|---|
| 4,415,767 A | * | 11/1983 | Gill et al. ............. 704/243 |
| 4,450,531 A | | 5/1984 | Kenyon et al. |
| 4,843,562 A | | 6/1989 | Kenyon et al. |
| 5,210,820 A | | 5/1993 | Kenyon |
| 5,918,223 A | | 6/1999 | Blum et al. ............. 707/1 |

(Continued)

FOREIGN PATENT DOCUMENTS

CN 97114185.1 6/1999

(Continued)

OTHER PUBLICATIONS

Chinese Office Action issued for 03808938.6 dated May 26, 2006.

(Continued)

*Primary Examiner*—Vijay B Chawan
(74) *Attorney, Agent, or Firm*—Woodcock Washburn LLP

(57) ABSTRACT

The present invention provides an innovative technique for rapidly and accurately determining whether two audio samples match, as well as being immune to various kinds of transformations, such as playback speed variation. The relationship between the two audio samples is characterized by first matching certain fingerprint objects derived from the respective samples. A set (230) of fingerprint objects (231, 232), each occurring at a particular location (242), is generated for each audio sample (210). Each location (242) is determined in dependence upon the content of the respective audio sample (210) and each fingerprint object (232) characterizes one or more local features (222) at or near the respective particular location (242). A relative value is next determined for each pair of matched fingerprint objects. A histogram of the relative values is then generated. If a statistically significant peak is found, the two audio samples can be characterized as substantially matching.

18 Claims, 8 Drawing Sheets

U.S. PATENT DOCUMENTS

| | | | |
|---|---|---|---|
| 6,088,455 A * | 7/2000 | Logan et al. ................ 380/200 |
| 6,434,520 B1 * | 8/2002 | Kanevsky et al. ........... 704/243 |
| 6,453,252 B1 * | 9/2002 | Laroche ....................... 702/75 |
| 6,480,825 B1 | 11/2002 | Sharma et al. .............. 704/270 |
| 6,483,927 B2 | 11/2002 | Brunk et al. ................ 382/100 |
| 6,990,453 B2 * | 1/2006 | Wang et al. ................. 704/270 |
| 7,082,394 B2 * | 7/2006 | Burges et al. ............... 704/243 |
| 7,174,293 B2 | 2/2007 | Kenyon et al. |
| 7,194,752 B1 | 3/2007 | Kenyon et al. |
| 7,328,153 B2 * | 2/2008 | Wells et al. ................ 704/231 |
| 2001/0044719 A1 * | 11/2001 | Casey .......................... 704/245 |
| 2002/0023020 A1 * | 2/2002 | Kenyon et al. ............... 705/26 |
| 2002/0072982 A1 * | 6/2002 | Barton et al. ................. 705/26 |
| 2004/0199387 A1 * | 10/2004 | Wang et al. ................. 704/243 |
| 2006/0122839 A1 * | 6/2006 | Li-Chun Wang et al. .... 704/273 |
| 2006/0277047 A1 * | 12/2006 | DeBusk et al. .............. 704/273 |

FOREIGN PATENT DOCUMENTS

| | | |
|---|---|---|
| WO | WO 01/04870 | 1/2001 |
| WO | WO 01/88900 | 11/2001 |
| WO | WO 02/11123 | 2/2002 |

OTHER PUBLICATIONS

Yang et al. "Music Database Retrieval Based on Spectral Similarity" http://dbpubs.stanford.edu/pub/2001-14.

Kashino et al. "A Quick Search Method for Audio and Video Signals Based on Histogram Pruning" (2003) Published in IEEE vol. 5, No. 3 p. 348-357.

* cited by examiner

ROBUST AND INVARIANT AUDIO PATTERN MATCHING

CROSS-REFERENCE TO RELATED APPLICATIONS

This application is a continuation of PCT International Application PCT/US03/12126, filed on Apr. 18, 2003, under 35 U.S.C. § 120, which claims the benefit of U.S. Provisional Application No. 60/376,055, filed on Apr. 25, 2002, each of which are hereby incorporated by reference.

FIELD OF THE INVENTION

This invention relates generally to audio signal processing over a large database of audio files. More particularly, it relates to an inventive technique for rapidly and accurately determining whether two audio samples match, as well as being immune to various transformations including playback speed variation. The inventive technique further enables accurate estimation of the transformations.

DESCRIPTION OF THE BACKGROUND ART

The need for fast and accurate automatic recognition of music and other audio signals continues to grow. Previously available audio recognition technology often traded off speed against accuracy, or noise immunity. In some applications, calculating a regression is necessary to estimate the slope of a time-time scatter-plot in the presence of extreme noise, which introduced a number of difficulties and lowered performance in both speed and accuracy. Previously existing audio recognition techniques were therefore incapable of performing fast and accurate recognition in the presence of significant playback speed variation, for example, in recognizing a recording that is played at a speed faster than normal.

Adding to the complexity of the problem is an increasingly popular kind of speed variation, pitch-corrected tempo variation, used by DJ's at radio stations, clubs, and elsewhere. Currently, there is no robust and reliable technique that can perform fast and accurate audio recognition in spite of the playback speed variations and/or pitch-corrected tempo variations.

SUMMARY OF THE INVENTION

The present invention fulfills the need in the audio recognition art by providing a fast and invariant method for characterizing the relationship between two audio files. The inventive method is accurate even in the presence of extreme noise, overcoming the aforementioned drawbacks of existing technology.

According to an aspect of the invention, the relationship between two audio samples can be characterized by first matching certain fingerprint objects derived from the respective samples. A set of fingerprint objects is generated for each audio sample. Each fingerprint object occurs at a particular location within the respective audio sample. Each location is determined in dependence upon the content of the respective audio sample and each fingerprint object characterizes one or more local features of the respective audio sample at or near the respective particular location. In one embodiment, each fingerprint object is further characterized by a variant component and an invariant component. A relative value is next determined for each pair of matched fingerprint objects. A histogram of the relative values is then generated. If a statistically significant peak is found in the histogram, then the two audio samples can be characterized as, for example, substantially matching.

According to another aspect of the invention, the above-described technique can be further enhanced by providing an estimate of a global relative value with a location of the peak on an axis of the histogram. The global relative value, in turn, can be refined by selecting a neighborhood around the peak of interest and calculating an average of the relative values in the selected neighborhood.

In yet another embodiment, in which a relative playback speed value is determined from the peak of the histogram, a compensated relative time offset value is calculated for each pair of matched fingerprint objects. Another histogram is generated based on the compensated relative time offset values. If a statistically significant peak is found in the second histogram, then the relationship between the two audio samples can be further characterized by the peak, providing further enhancement to the accuracy of the invention.

DETAILED DESCRIPTION

The present invention enables fast, robust, invariant, and scalable indexing and searching over a large database of audio files and is particularly useful for audio pattern recognition applications. In some embodiments, the techniques disclosed herein improve and enhance the audio recognition system and methods disclosed in the above-referenced U.S. patent application.

A very fast and efficient comparison operation between two audio sample files is essential in building a commercially viable audio recognition system. According to an aspect of the invention, the relationship between two audio samples can be characterized by first matching certain fingerprint objects derived from a spectrogram, such as one shown in FIG. 1, of the respective audio samples. The spectrogram is a time-frequency representation/analysis that is generated by taking samples 2*K at a time in a sliding window frame and computing a Fourier Transform, thereby generating K frequency bins in each frame. The frames may overlap to improve the time resolution of the analysis. The particular parameters used depend on the kind of audio samples being processed. Preferably, discrete-time audio files with an 8 kilohertz sampling rate, frames with K=512, and a stride of 64 samples are used.

Fingerprint Objects

Figure 1:
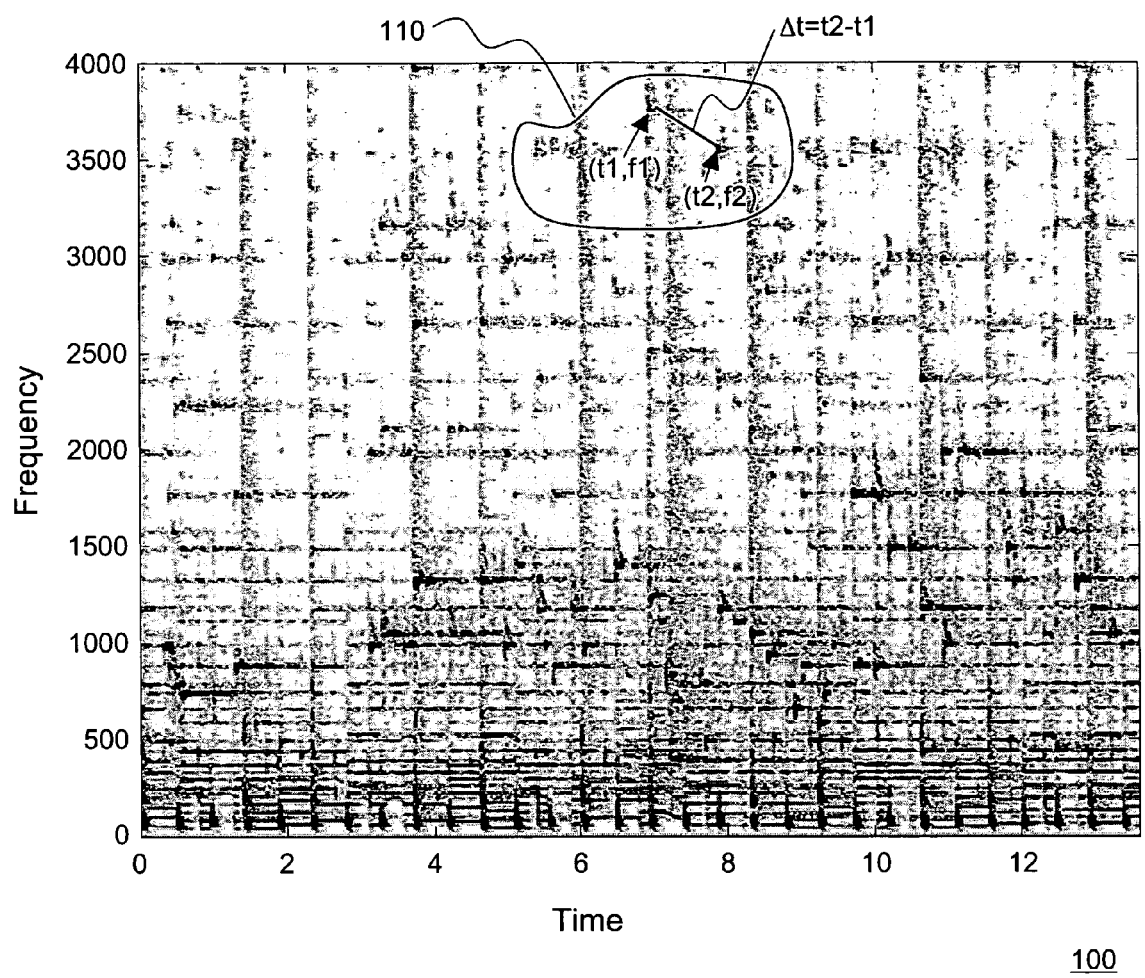
FIG. 1 is a spectrogram representation of an analyzed audio sample.
Figure 2:
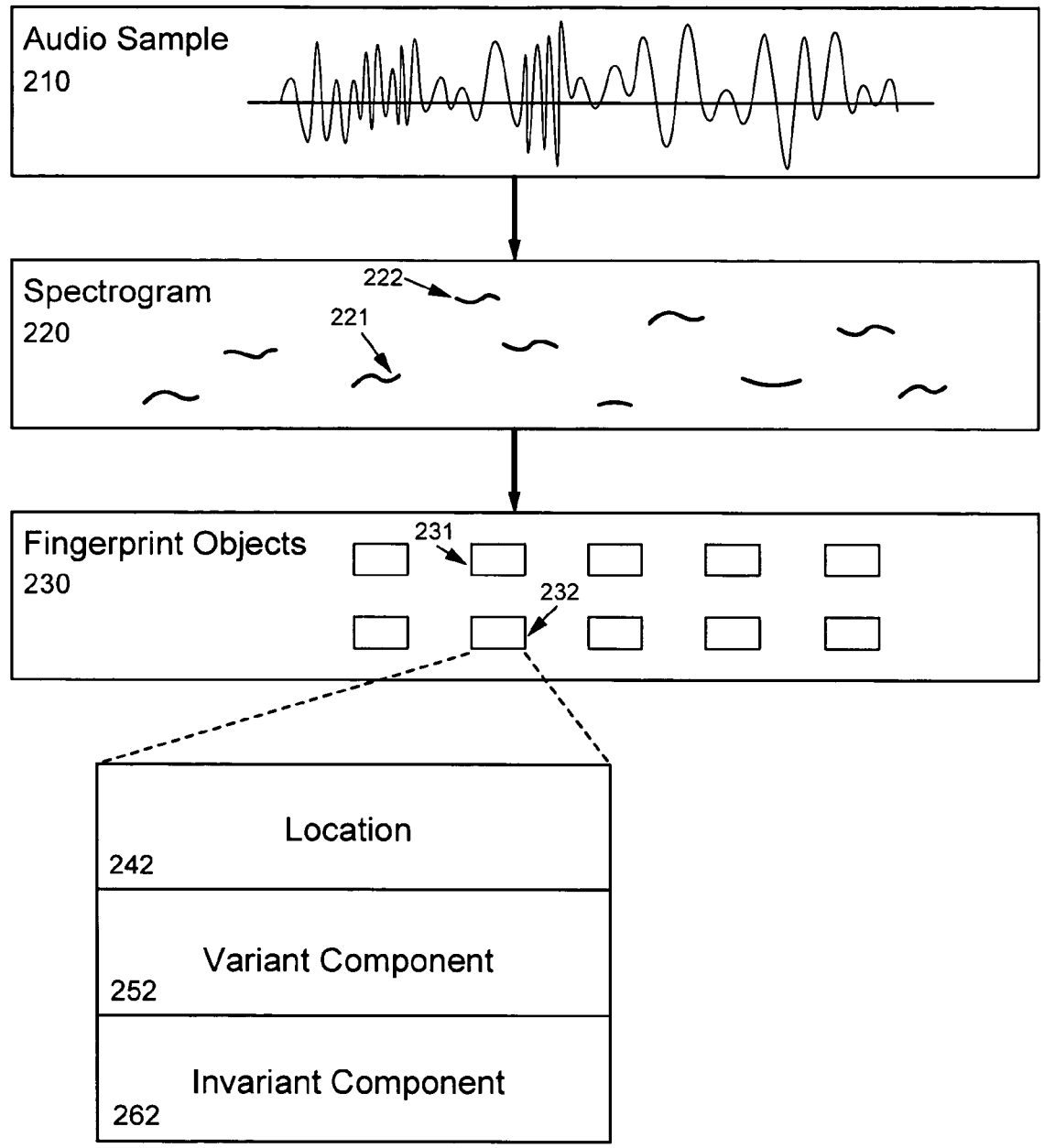
FIG. 2 is an exemplary diagram showing fingerprint objects being generated from an audio sample in accordance with an aspect of the invention.

After a spectrogram of each audio sample is generated, it is scanned for local features, e.g., local energy peaks, as shown in FIG. 2. The matching process starts by extracting a set of fingerprint objects from the corresponding local features for each audio sample. In an exemplary embodiment, one audio sample is an unknown sound sample to be recognized and the other audio sample is a known recording stored in a database. Each fingerprint object occurs at a particular location within the respective audio sample. In some embodiments, each fingerprint object is located at some time offset within an audio file and contains a set of descriptive information about the audio file near its respective time coordinate. That is, descriptive information contained in each fingerprint object is computed with dependency on the audio sample near the respective time offset. This is encoded into a small data structure. Preferably, the location and descriptive information are determined in a way that is generally reproducible even in the presence of noise, distortion, and other transformations such as varying playback speed. In this case, each location is determined in dependence upon the content of the respective audio sample and each fingerprint object characterizes one or more local features of the respective audio sample at or near the respective particular location, e.g., location (t1,f1) or (t2, f2) as shown in FIG. 1.

In an exemplary embodiment, each fingerprint object is characterized by its location, a variant component, and an invariant component. Each local feature is a spectrogram peak and each frequency value is determined from a frequency coordinate of a corresponding spectrogram peak. The peaks are determined by searching in the vicinity of each time-frequency coordinate and selecting the points that have a greater magnitude value than its neighbors. More specifically, as shown in FIG. 2, an audio sample 210 is analyzed into a spectrogram representation 220 with regions 221 and 222 of high energy shown. Information related to local energy regions 221 and 222 is extracted and summarized into a list 230 of fingerprint objects 231, 232, etc. Each fingerprint object optionally includes a location field 242, a variant component 252, and an invariant component 262. Preferably, a neighborhood is selected such that each chosen point is the maxima within a 21×21 unit block centered around thereof. Readers are referred to the above-referenced U.S. patent application for more discussion on neighborhoods and point selection. Next, a relative value is determined for each pair of matched fingerprint objects. In some embodiments, the relative value is a quotient or difference of logarithm of parametric values of the respective audio samples. A histogram of the relative values is then generated. If a statistically significant peak is found in the histogram, then the two audio samples can be characterized as substantially matching.

Figure 3:
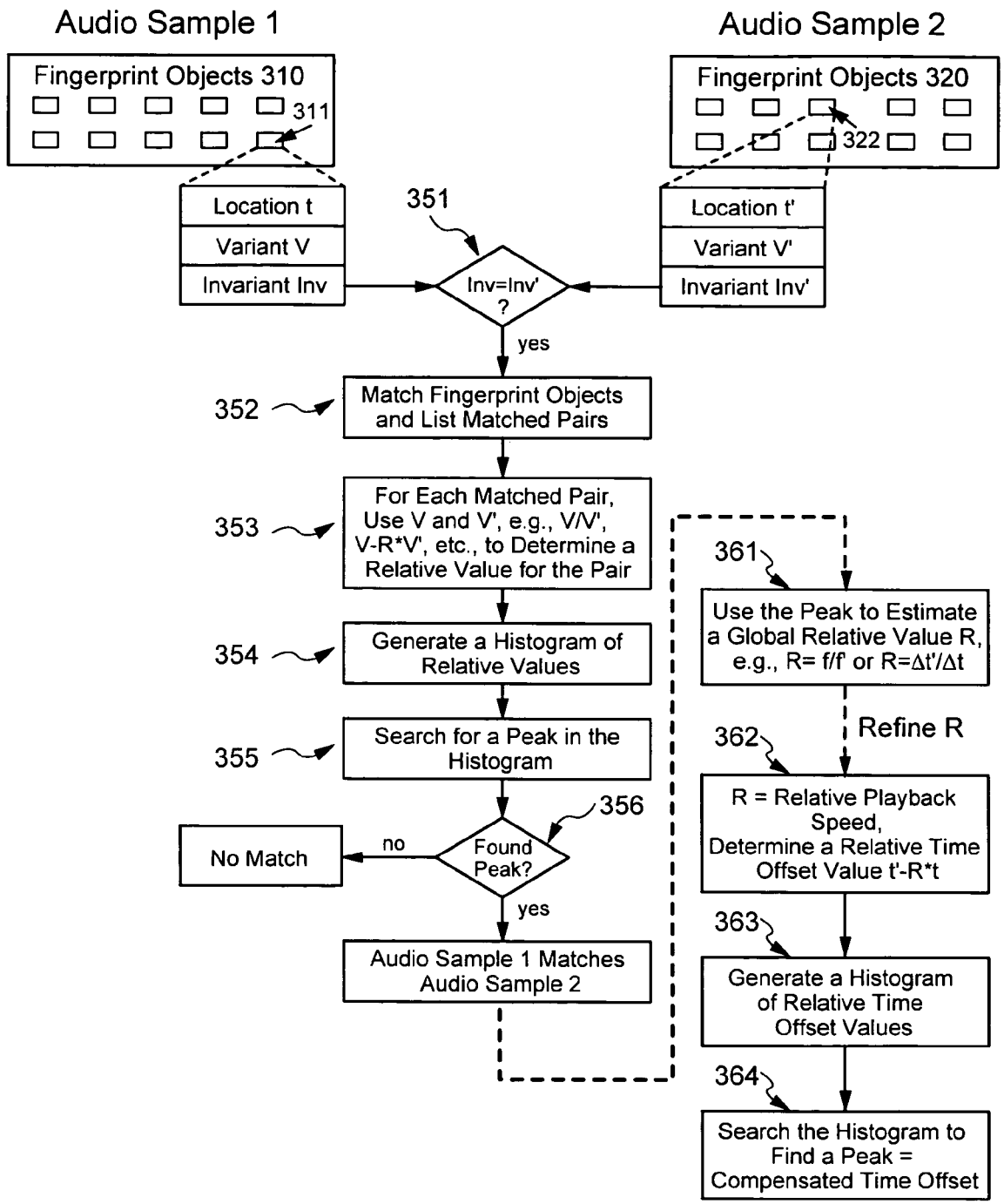
FIG. 3 illustrates two audio samples being compared in accordance with the principles of the present invention
Figure 4A:
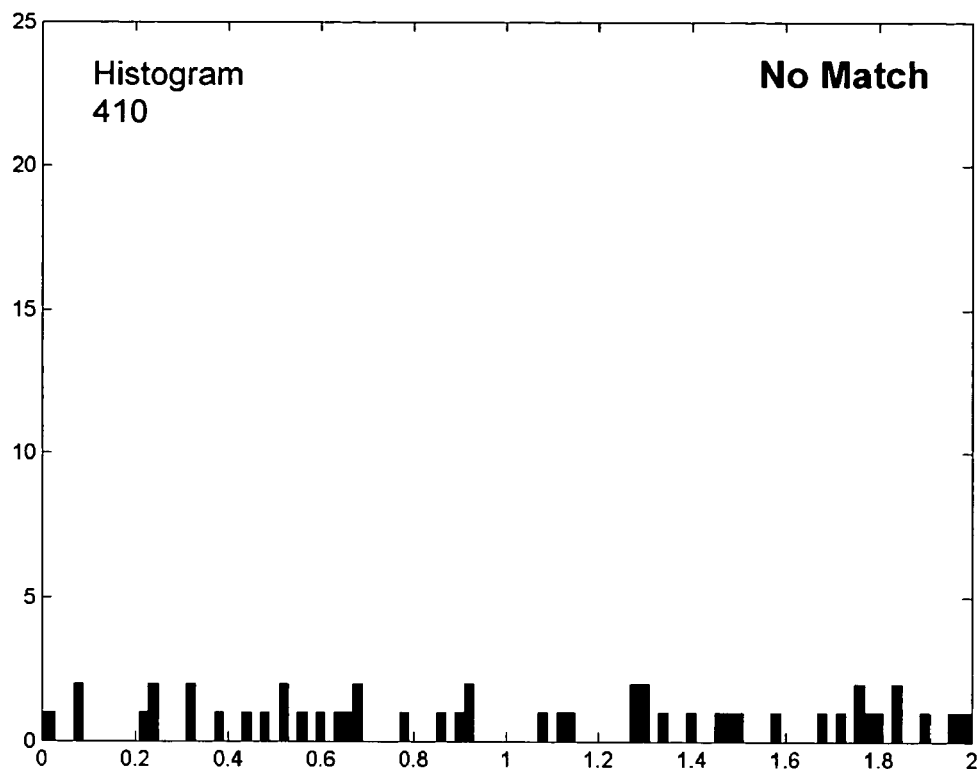
FIGS. 4A-B show exemplary histograms with and without a statistically significant peak.
Figure 4B:
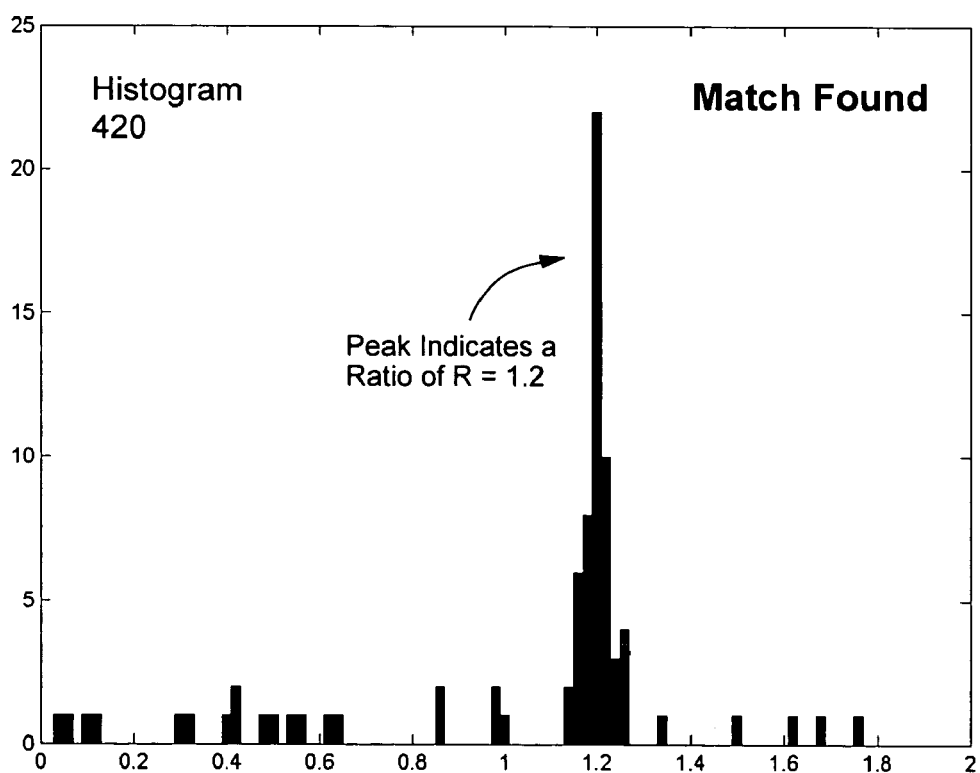

Referring to FIG. 3, fingerprint object lists 310 and 320 are respectively prepared as described above for audio samples 1 and 2, respectively. Respective fingerprint objects 311 and 322 from each list are compared. Matching fingerprint objects are paired, e.g., using respective invariant components Inv and Inv' in step 351, and put into a list in step 352. Relative values are computed for each matched pair in step 353. Next, in step 354, a histogram of relative values is generated. The histogram is searched for a statistically significant peak in step 355. If none is found in step 356, then the audio samples 1 and 2 do not match, e.g., histogram 410 of FIG. 4A. Alternatively, if a statistically significant peak is detected, then the audio samples 1 and 2 match, e.g., histogram 420 of FIG. 4B.

The above-described technique can be further enhanced by providing an estimate of a global relative value R with a location of the peak on an axis of the histogram, as illustrated in step 361. In some embodiments, R can be refined by first selecting a neighborhood around the peak of interest. In FIG. 1, this is shown as an area of interest 110 around a particular location (t1,f1). Next, an average of the relative values in the selected neighborhood is calculated. The average may be a weighted average calculated with number of points at each relative value in the selected neighborhood. In some embodiments, R can be further refined to generate a relative time offset value t'−R*t for each matched pair. Steps 362-364 show that, with these relative time offset values, a second histogram is generated, allowing a compensated time offset to be calculated.

Other kinds of time-frequency analyses may be implemented for extracting fingerprint objects, e.g., the Wigner-Ville distribution or wavelets. Also, instead of spectrogram peaks, other features, e.g., cepstral coefficients, can be used. Further, super-resolution techniques could be used to obtain finer frequency and time estimates of the time-frequency coordinates provided by the spectrogram peaks. For example, parabolic interpolation on frequency bins could be used to increase the frequency resolution. Related exemplary teachings can be found in "PARSHL: An Analysis/Synthesis Program for Non-Harmonic Sounds Based on a Sinusoidal Representation", Julius O. Smith III and Xavier Serra, Proceedings of the International Computer Music Conference (ICMC-87, Tokyo), Computer Music Association, 1987, and in "Modern Spectral Estimation: Theory and Application," by Steven M. Kay (January 1988) Prentice Hall, both of which are incorporated herein by reference.

Matching

In a matching operation, two audio samples are compared via their respective fingerprint objects. As discussed before with reference to FIG. 3, pairs of matched fingerprint objects are generated, each pair containing substantially matching components. One way of preparing the data to allow for fast searching is to encode the fingerprint objects into numeric tokens, such as 32-bit unsigned integers, and using the numeric tokens as a key for sorting and searching. Techniques for efficient data manipulation are well-known in the art, for example, "Art of Computer Programming, Volume 3: Sorting and Searching (2nd Edition)," by Donald Ervin Knuth (April 1998) Addison-Wesley, which is incorporated herein by reference.

Figure 5A:
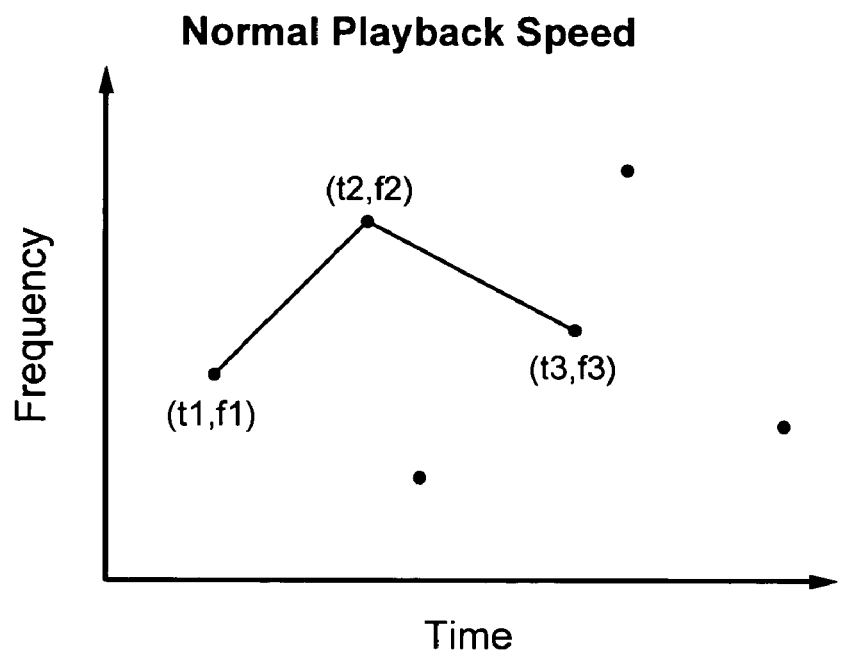
FIGS. 5A-B illustrate the motion of time-frequency points as the playback speed varies.
Figure 5B:
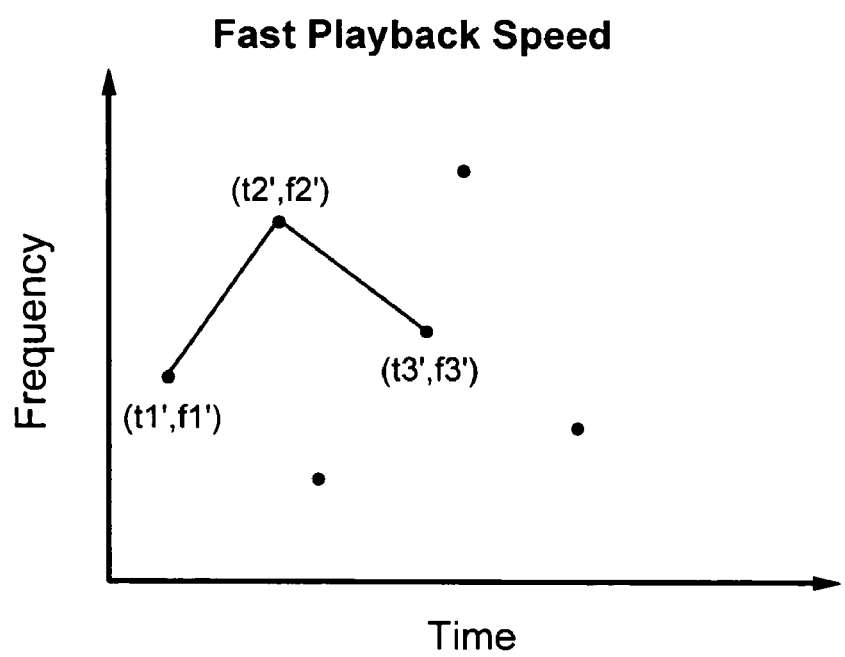

In an exemplary embodiment, each fingerprint object contains an invariant component and a variant component. The invariant component refers to the ratios of frequency values corresponding to spectral peaks, as well as ratios of delta time (i.e., time difference) values between spectral peaks are invariant under time stretch. For example, referring to FIGS. 5A and 5B, if an audio sample's spectrogram has some local spectral peaks with coordinates (t1,f1), (t2,f2), and (t3,f3) then an invariant for two points is f2/f1, i.e., f2'/f1'=f2/f1. Additional invariants for 3 points are given by f3/f1, (t3−t1)/(t2−t1), or (t3−t2)/(t2−t1), or any other combination created by permuting the points and/or computing functions of these quantities or combinations of these quantities. For example, f2/f3 could be created by dividing f2/f1 by f3/f1. Furthermore, if the audio sample is linearly stretched, such as simply being played back faster, then additionally frequency and delta time enjoy a reciprocal relationship, so that quantities such as f1*(t2−t1) are also invariant. Logarithms of these quantities may be used, substituting addition and subtraction for multiplication and division. To discover both the frequency and time stretch ratios, assuming they are independent, it is necessary to have both a frequency variant and a time variant quantity.

To make matching efficient, we use the invariant part to index the fingerprints and use approximate or exact values to search. Searching using approximate matches allows for some extra robustness against distortions and rounding error, but incurs more cost if the search over the invariant components becomes a multidimensional range search. In the preferred embodiment, the invariant component of respective fingerprint objects is required to match exactly, thus yielding a system that is very fast, with a minor tradeoff against sensitivity of recognition in the presence of noise. It is important to note that this method works well even if only a minority of fingerprint objects in corresponding audio samples match correctly. In the histogram peak detection step, a peak may be statistically significant even if as few as 1-2% of the fingerprint objects are correctly matched and survive.

The variant component can also be used to narrow down the number of matching fingerprint objects, in addition to, or instead of the invariant component. For example, we could require that a variant component V from the first audio sample match a corresponding V' from the second audio sample within +/−20%. In that case, we can form a representation of the numeric tokens such that the upper portion (e.g., most significant bits) contains the invariant components, and the lower portion (e.g., least significant bits) contains the variant components. Then, searching for an approximate match becomes a range search over the tokens composed using the lowest and highest values of the variant component. The use of an invariant component in matching is thus not strictly necessary if searching is done using a variant component. However, using an invariant component in the matching process is recommended since it helps to reduce the number of spurious matches, thus streamlining the histogramming process and reducing the amount of processing overhead.

On the other hand, the novel variant component itself may or may not be a part of the matching criteria between two fingerprint objects. The variant component represents a value that may be distorted by some simple parametric transformation going from an original recording to a sampled recording. For example, frequency variant components, such as f1, f2, f3, and time variant components such as (t2−t1), (t3−t1), or (t3−t2) may be chosen as variant components for playback speed variation. Suppose a second audio sample, say a matching rendition from a database, had a spectrogram with coordinates (t1',f1'), (t2',f2'), and (t3',f3'), corresponding to the same points listed above for the first audio sample. Then the frequency component f1' could have a scaled value $f1'=R_f*f1$, where $R_f$ is a linear stretch parameter describing how much faster or slower the first sample recording was compared to the second. The variant component from each of the two matching audio samples can be used to calculate an estimate of the global stretch value, which describes a macroscopic parameter, by calculating the ratio between the two frequency values, $R_f=f1'/f1$. This gives the relative pitch ratio of the two matched time-frequency points; for example, $R_f=2$ means that the first audio sample has half the pitch (frequency) of the second. Another possibility is to use $R_t=(t2'-t1')/(t2-t1)$. In this case, the relative value R is the relative playback speed ratio, i.e., $R_t=2$ means that the first audio sample is playing back twice as fast as the second audio sample.

If $R_f=1/R_t$, i.e., $f'/f=(t2-t1)/(t2'-t1')$, then the two audio samples are related by a linear time stretch, due to the reciprocal time-frequency relationship for such audio samples. In this case, we can first use the histogramming method disclosed herein to form an estimate $R_f$ of the relative frequency ratio using corresponding variant frequency components, and again to form an estimate of $R_t$ of the relative playback speed, then perform a comparison to detect whether the playback relationship is linear or nonlinear.

In general, a relative value is calculated from matched fingerprint objects using corresponding variant components from the first and second audio samples. The relative value could be a simple ratio of frequencies or delta times, or some other function that results in an estimate of a global parameter used to describe the mapping between the first and second audio sample. But generally, any 2-input function F( ) may be used, e.g. R=F(v1,v1'), where v1 and v1' are respective variant quantities. It is best if F( ) is a continuous function so that small errors in measuring v1 and v1' result in small errors in the output R.

Histogramming

As described herein, a histogram is generated over the set of relative values calculated from the list of matching pairs of fingerprint objects. The histogram is then searched for a peak. The presence of a statistically significant peak in the histogram indicates that a possible match has occurred. This method particularly searches for a cluster in the histogram of relative values instead of differences of time offsets, such as (t1'−t1). According to a principle of the present invention, a histogram serves to form bins of count values, each bin corresponding to a particular value along the independent axis of the histogram. For the purpose of this invention, generating a histogram may be accomplished by simply sorting the list of relative values. Therefore, a fast and efficient way of detecting the peak of a histogram of a list of values is to sort the list in ascending order, then scan for the largest clump of items having the same or similar values.

Statistical Significance

As discussed herein, with the present invention, two audio samples can be correctly matched even if only as few as 2% of the fingerprint objects survive all the distortions and are correctly matched. This is possible by scoring the comparison between the two audio samples. Specifically, a neighborhood is chosen around the peak of the histogram and all the matching pairs falling into the neighborhood are counted, giving the score. Additionally, a weighted score may be computed, discounting the contribution of pairs that are farther from the center of the peak.

One way to estimate the cutoff criterion is to assume that the probability distribution of the score of a non-matching track falls off with an exponential tail. The model is applied to the actual measured distribution of scores of non-matching tracks. Next the cumulative probability distribution of the highest score over a database of N tracks (e.g., taken as the Nth power of the cumulative probability distribution of a single non-matching score) is calculated. Once the probability curve is known and a maximum level of false positives is chosen (e.g., 0.5%), then a numeric threshold can be chosen and used to determine whether the histogram peak has a statistically significant number of matching pairs.

Hyperfine Estimation

Once a statistically significant histogram peak is found, a high-resolution "hyperfine" estimate of the global relative value (such as relative playback speed) may be computed. This is accomplished by choosing a neighborhood around the peak, e.g., including an interval about 3 or 5 bins wide centered on the peak histogram bin, and calculating an average of the relative values in the neighborhood. Using this technique, we can find relative playback speed accurate to within 0.05%. With offset derivation disclosed herein, the global time offset may be estimated with better than 1 millisecond accuracy, which is finer than the time resolution of the spectrogram frames discussed above.

Robust Regression

Figure 6A:
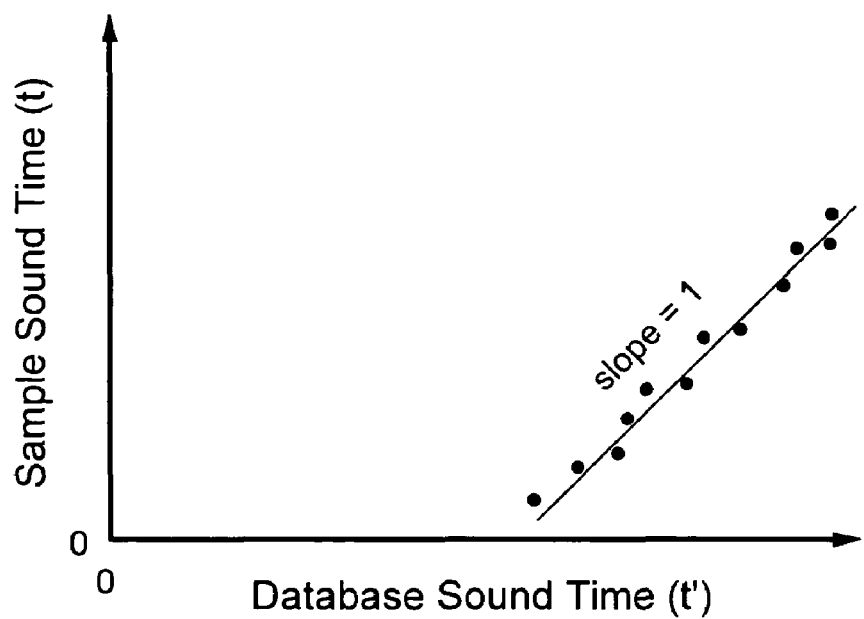
FIGS. 6A-B show corresponding times in a first audio sample (sample sound) and a second audio sample (database sound) of matching hash tokens. The slope equals one when the playback speed of the sample sound is the same as the database sound.

As discussed in the above-referenced U.S. patent application, in the case that the samples actually matched, a diagonal line could be seen in a scatterplot where matching samples have the corresponding time coordinates (t',t) of matching fingerprint objects plotted against each other, as shown in FIG. 6A. The challenge is to find the equation of the regressor, which is determined by the slope and offset of the line, in the presence of a high amount of noise. The slope indicates the relative playback speed, and the offset is the relative offset from the beginning of one audio sample to the beginning of the second. Conventional regression techniques, such as least-mean square fitting, are available, for example, "Numerical Recipes in C: The Art of Scientific Computing (2nd Edition)," by William H. Press, Brian P. Flannery, Saul A. Teukolsky, and William T. Vetterling (January 1993), Cambridge University Press, which is incorporated herein by reference. Unfortunately, these conventional techniques suffer from disproportionate sensitivity, wherein a single far outlier can drastically skew the estimated regression parameters. In practice, points are often dominated by outliers, making it very difficult to detect the correct diagonal line. Other techniques for robust regression can be used to overcome the outlier problem to find a linear relation among points in the presence of noise, but these tend to be slow and iterative and have the possibility of getting stuck in a local optimum. A wide variety of techniques exist in the literature for finding an unknown linear regressor. The Matlab toolkit, available from The Mathworks and incorporated herein by reference, contains a variety of software routines for regression analysis.

Figure 6B:
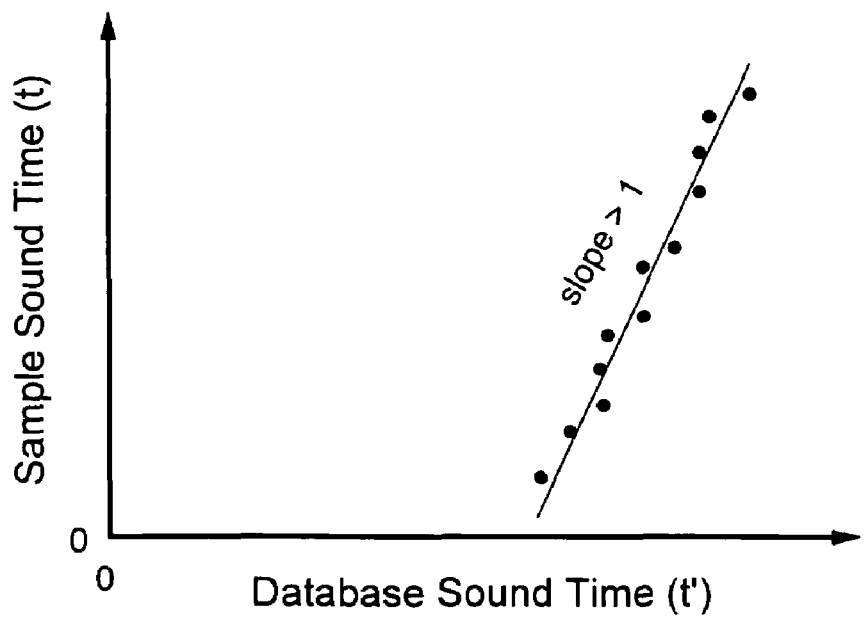

The present invention provides an inventive method of estimating the relative playback speed (or, equivalently, the reciprocal of the relative pitch, in the case of a linear playback relationship) that solves the problem of finding a regression line in the time-time scatterplot even if the slope of the match does not equal to one, e.g., FIG. 6B. The use of the histogram of local relative playback speeds, as disclosed herein, takes advantage of information not previously considered and provides an unexpected advantage of quickly and efficiently solving the regression problem.

Figure 7A:
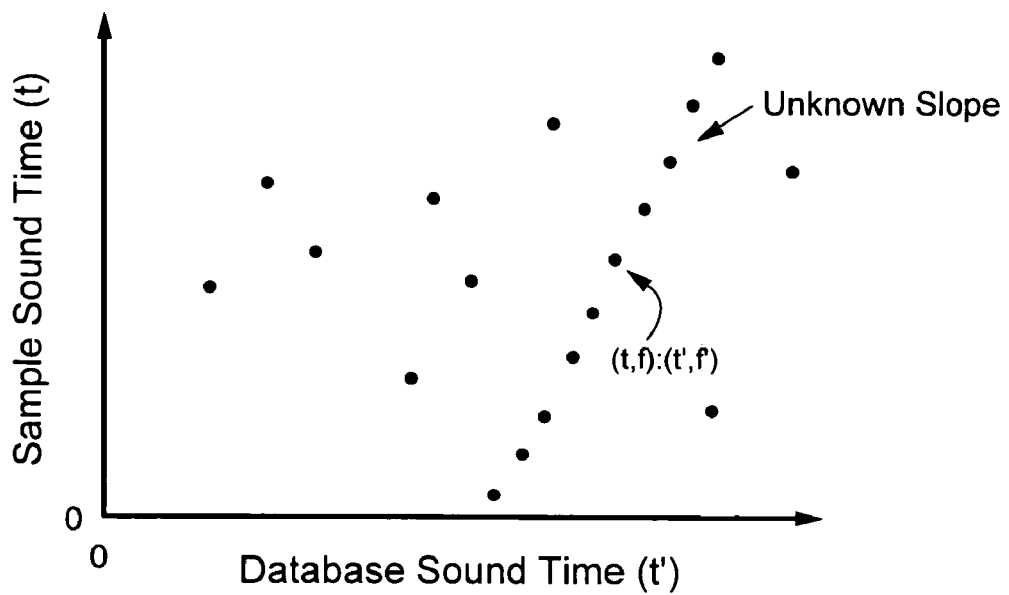
FIGS. 7A-D illustrate fast and efficient slope finding and histogramming techniques of the present invention.
Figure 7B:
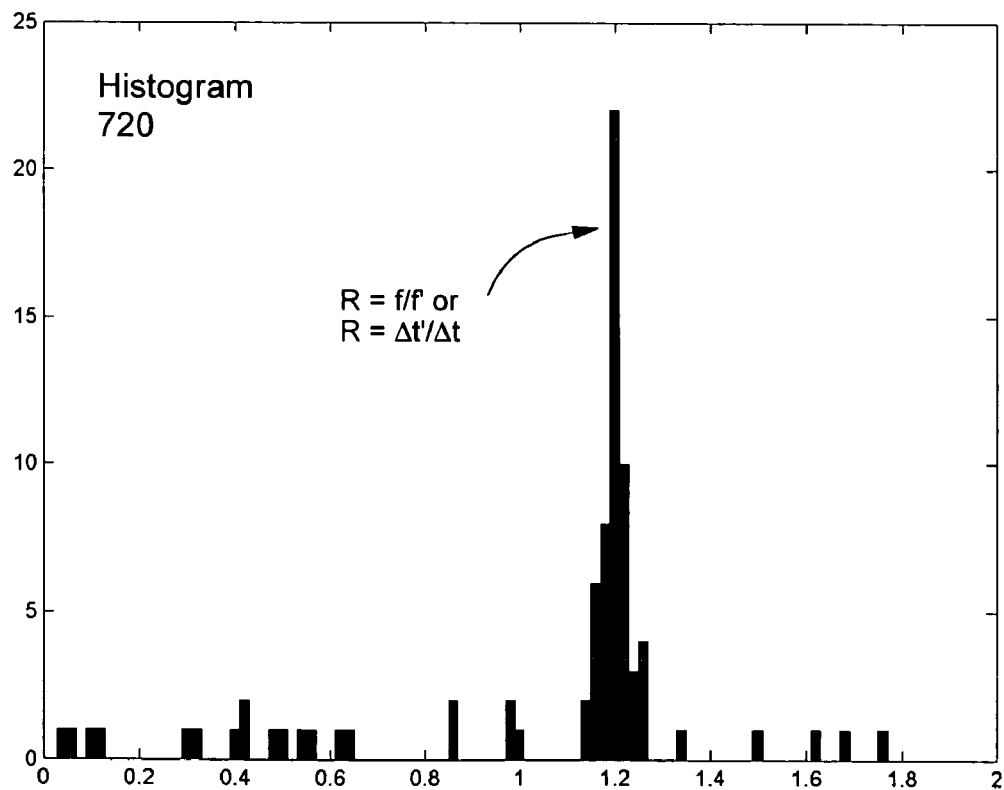
Figure 7C:
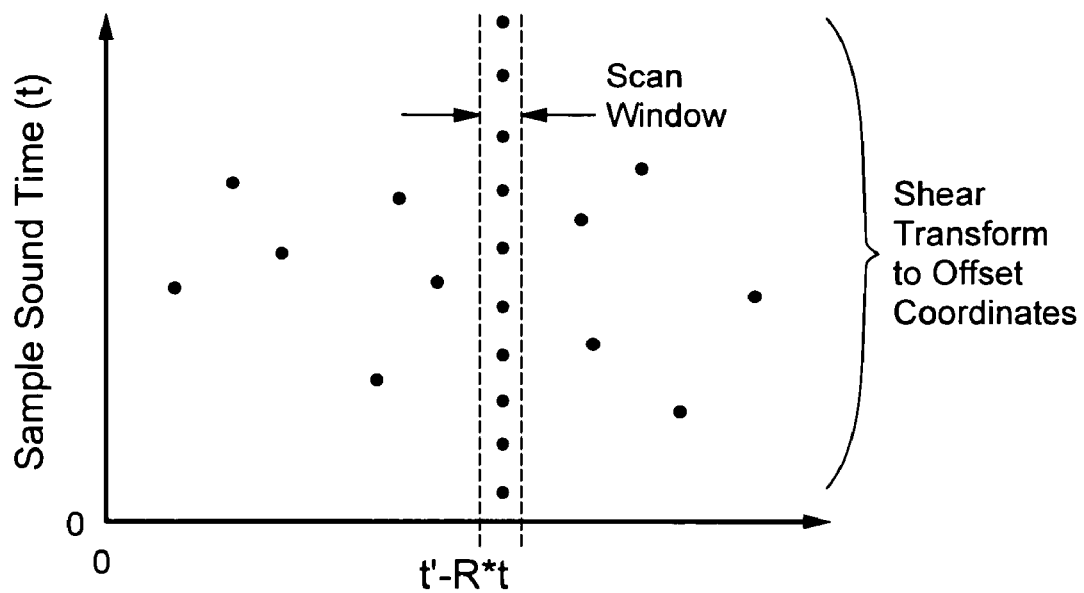
Figure 7D:
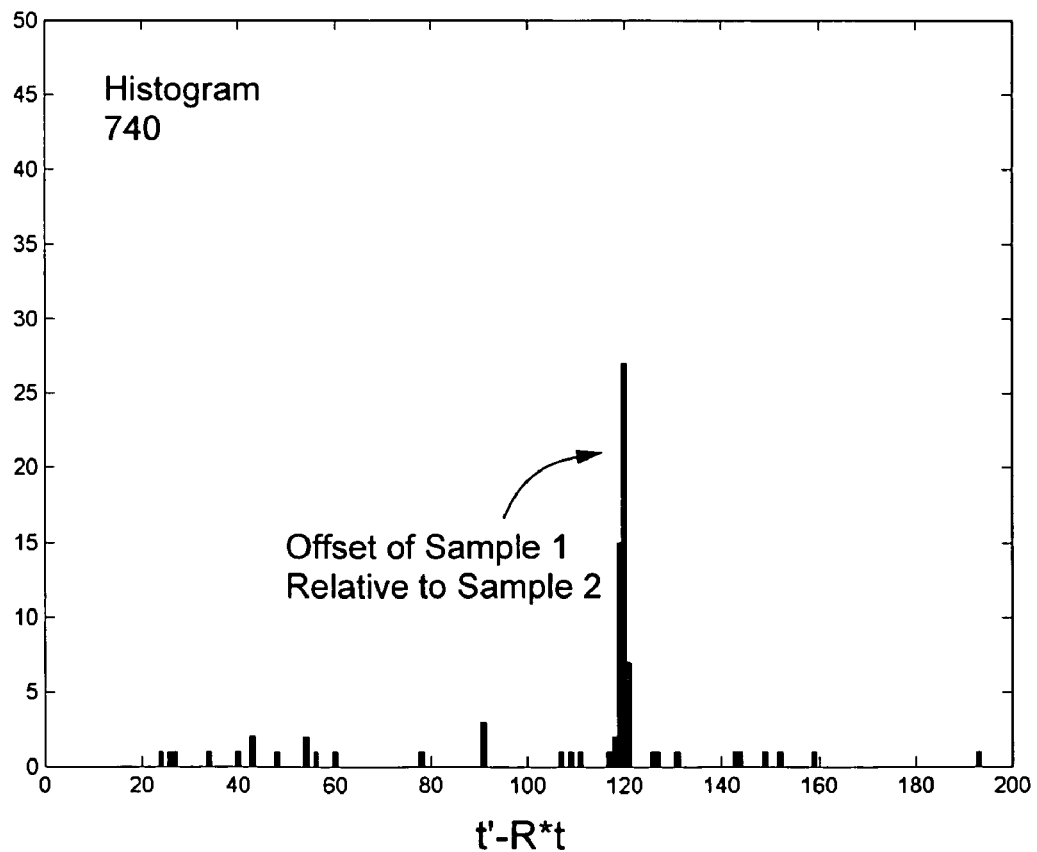

To find the offset, assume that the corresponding time points have the relation $$\text{offset} = t1' - R_t * t1,$$

where $R_t$ is obtained as discussed before. This is the compensated time offset and serves to normalize the time coordinate systems between the two audio samples. This can also be seen as a shear transformation on the time-time scatterplot that makes the diagonal line of unknown slope in FIG. 7A vertical in FIG. 7C. Histogram 720 of FIG. 7B illustrates a peak of accumulated relative playback speed ratios indicating the global relative playback speed ratio R. New relative values are then given by the offset formula, and a new histogram 740 is generated, as seen in FIG. 7D. The peak of the new histogram 740 gives an estimate of the global offset, which can be sharpened by using an average of the values in the peak's neighborhood, as described above.

In summary, the first histogramming stage provides a way to estimate the relative playback speed, as well determining whether a match exists. The second histogramming stage ensures that the candidate matching audio samples have a significant number of fingerprint objects that are also temporally aligned. The second histogramming stage also serves as a second independent screening criterion and helps to lower the probability of false positives, thus providing a stronger criterion for deciding whether two audio samples match. The second histogramming stage may be optionally performed only if there is a statistically significant peak in the first histogram, thus saving computational resource and effort. A further optimization may be optionally performed, e.g., to reduce computational clutter, instead of computing the second histogram over all the pairs of matched fingerprint objects in the list, the second histogram can be generated using only the matching pairs corresponding to the first histogram peak.

Synchronization of Multiple Recordings

The present invention may be implemented for cueing and time alignment of unsynchronized audio recordings. For example, suppose a DAT recorder and a cassette recorder were operated independently with different microphones at slightly different locations or environments. If it is later desired to combine the two recordings from respective recorders into one mix, the two tracks may be synchronized using the robust regression technique described herein to obtain the time offset. As such, even if the unsynchronized recorders operate at slightly different speeds, the relative speed can be determined with a high degree of accuracy, allowing one recording be compensated with reference to another. This is especially useful if it is found that one of the recordings has become corrupted and needs to be supplemented from another source. The time alignment and synchronization as described herein thus allow for transparent mixing.

Database Search

Since the comparison method is extremely fast, it is possible to pre-process a large database of audio samples into respective lists of fingerprint objects. As one skilled in the art would appreciate, an unknown audio sample may therefore be pre-processed into its own respective list of fingerprint objects using currently available data processing techniques. The above described matching, histogramming, and peak detection techniques can then be carried out using the pre-processed fingerprint objects in the database to find a match.

Although the present invention and its advantages have been described in detail, it should be understood that the present invention is not limited to or defined by what is shown or discussed herein. In particular, drawings and description disclosed herein illustrate technologies related to the invention, show examples of the invention, and provide examples of using the invention and are not to be construed as limiting the present invention. Known methods, techniques, or systems may be discussed without giving details, so to avoid obscuring the principles of the invention. As it will be appreciated by one of ordinary skill in the art, the present invention can be implemented, modified, or otherwise altered without departing from the principles and spirit of the present invention. For example, methods, techniques, and steps described herein can be implemented or otherwise realized in a form of computer-executable instructions embodied in a computer readable medium. Alternatively, the present invention can be implemented in a computer system having a client and a server. The client sends information, e.g., fingerprint objects, necessary for the characterization of the relationship between the first and second audio samples to the server where the characterization is performed. Accordingly, the scope of the invention should be determined by the following claims and their legal equivalents.

What is claimed is:

1. A method of characterizing a relationship between a first and a second audio sample, the method comprising:

generating a first set of fingerprint objects for the first audio sample, each fingerprint object occurring at a respective location within the first audio sample, the respective location being determined in dependence upon the content of the first audio sample, and each fingerprint object characterising one or more features of the first audio sample at or near each respective location;

generating a second set of fingerprint objects for the second audio sample, each fingerprint object occurring at a respective location within the second audio sample, the respective location being determined in dependence upon the content of the second audio sample, and each fingerprint object characterising one or more features of the second audio sample at or near each respective location;

pairing fingerprint objects by matching a first fingerprint object from the first audio sample with a second fingerprint object from the second audio sample that is substantially similar to the first fingerprint object;

generating, based on the pairing, a list of pairs of matched fingerprint objects;

determining a relative value for each pair of matched fingerprint objects;

generating a histogram of the relative values; and searching for a statistically significant peak in the histogram, the peak characterizing the relationship between the first and second audio samples.

2. The method according to claim 1 in which the relationship between the first and second audio samples is characterized as substantially matching if a statistically significant peak is found.

3. The method according to claim 1 or 2, further comprising estimating a global relative value with a location of the peak on an axis of the histogram, the global relative value further characterizing the relationship between the first and second audio samples.

4. The method according to claim 3, further comprising determining a hyperfine estimate of the global relative value, wherein determining a hyperfine estimate of the global relative value comprises:
   selecting a neighbourhood around the peak, and
   calculating an average of the relative values in the neighbourhood.

5. The method according to claim 1 in which each fingerprint object has an invariant component, and the first and second fingerprint objects in each pair of matched fingerprint objects have matching invariant components.

6. The method according to claim 5 in which the invariant component is generated using at least one of:
   (i) a ratio between a first and a second frequency values, each frequency value being respectively determined from a first and a second local features near the respective location of each fingerprint object;
   (ii) a product between a frequency value and a delta time value, the frequency value being determined from a first local feature, and the delta time value being determined between the first local feature and a second local feature near the respective location of each fingerprint object; and
   (iii) a ratio between a first and a second delta time values, the first delta time value being determined from a first and a second local features, the second delta time value being determined from the first and a third local features, each local feature being near the respective location of each fingerprint object.

7. The method according to claim 6 in which each local feature is a spectrogram peak and each frequency value is determined from a frequency coordinate of a corresponding spectrogram peak.

8. The method according to claim 1 or 5 in which each fingerprint object has a variant component, and the relative value of each pair of matched fingerprint objects is determined using respective variant components of the first and second fingerprint objects.

9. The method according to claim 8 in which the variant component is a frequency value determined from a local feature near the respective location of each fingerprint object such that the relative value of a pair of matched fingerprint objects being characterized as a ratio of respective frequency values of the first and second fingerprint objects and the peak in the histogram characterizing the relationship between the first and second audio samples being characterized as a relative pitch, or, in case of linear stretch, a relative playback speed.

10. The method according to claim 9, wherein the ratio of respective frequency values is characterized as being either a division or a difference of logarithms.

11. The method according to claim 9, in which each local feature is a spectrogram peak and each frequency value is determined from a frequency coordinate of a corresponding spectrogram peak.

12. The method according to claim 8, in which the variant component is a delta time value determined from a first and a second local features near the respective location of each fingerprint object such that the relative value of a pair of matched fingerprint objects being characterized as a ratio of respective variant delta time values and the peak in the histogram characterizing the relationship between the first and second audio samples being characterized as a relative playback speed, or, in case of linear stretch, a relative pitch.

13. The method according to claim 12, wherein the ratio of respective variant delta time values is characterized as being either a division or a difference of logarithms.

14. The method according to claim 12, in which each local feature is a spectrogram peak and each frequency value is determined from a frequency coordinate of a corresponding spectrogram peak.

15. The method according to claim 8, further comprising:
   determining a relative pitch for the first and second audio samples using the respective variant components, wherein each variant component is a frequency value determined from a local feature near the respective location of each fingerprint object;
   determining a relative playback speed for the first and second audio samples using the respective variant components, wherein each variant component is a delta time value determined from a first and a second local features near the respective location of each fingerprint object; and
   detecting if the relative pitch and a reciprocal of the relative playback speed are substantially different, in which case the relationship between the first and second audio samples is characterized as nonlinear.

16. The method according to claim 1, wherein R is a relative playback speed value determined from the peak of the histogram of the relative values, and further comprising:
   for each pair of matched fingerprint objects in the list, determining a compensated relative time offset value, $t-R*t'$, where t and t' are locations in time with respect to the first and second fingerprint objects;
   generating a second histogram of the compensated relative time offset values; and
   searching for a statistically significant peak in the second histogram of the compensated relative time offset values, the peak further characterizing the relationship between the first and second audio samples.

17. A computer readable storage medium having stored thereon computer executable instructions for characterizing a relationship between a first and a second audio sample, the computer executable instructions comprising instructions for:

generating a first set of fingerprint objects for the first audio sample, each fingerprint object occurring at a respective location within the first audio sample, the respective location being determined in dependence upon the content of the first audio sample, and each fingerprint object characterising one or more features of the first audio sample at or near each respective location;

generating a second set of fingerprint objects for the second audio sample, each fingerprint object occurring at a respective location within the second audio sample, the respective location being determined in dependence upon the content of the second audio sample, and each fingerprint object characterising one or more features of the second audio sample at or near each respective location;

pairing fingerprint objects by matching a first fingerprint object from the first audio sample with a second fingerprint object from the second audio sample that is substantially similar to the first fingerprint object;

generating, based on the pairing, a list of pairs of matched fingerprint objects;

determining a relative value for each pair of matched fingerprint objects;

generating a histogram of the relative values; and searching for a statistically significant peak in the histogram, the peak characterizing the relationship between the first and second audio samples.

18. A computer system for characterizing a relationship between a first and a second audio sample, the computer system comprising:

a client for sending information for use in characterizing the relationship between the first and second audio sample; and a server that receives the information and characterizes the relationship between the first and the second audio sample, wherein the server comprises a processor that executes computer executable instructions, and wherein the computer executable instructions comprise instructions for:

generating a first set of fingerprint objects for the first audio sample, each fingerprint object occurring at a respective location within the first audio sample, the respective location being determined in dependence upon the content of the first audio pg,20 sample, and each fingerprint object characterising one or more features of the first audio sample at or near each respective location;

generating a second set of fingerprint objects for the second audio sample, each fingerprint object occurring at a respective location within the second audio sample, the respective location being determined in dependence upon the content of the second audio sample, and each fingerprint object characterising one or more features of the second audio sample at or near each respective location;

pairing fingerprint objects by matching a first fingerprint object from the first audio sample with a second fingerprint object from the second audio sample that is substantially similar to the first fingerprint object;

generating, based on the pairing, a list of pairs of matched fingerprint objects;

determining a relative value for each pair of matched fingerprint objects;

generating a histogram of the relative values; and searching for a statistically significant peak in the histogram, the peak characterizing the relationship between the first and second audio samples.

\* \* \* \* \*